(12) United States Patent
Ota

(10) Patent No.: US 12,388,555 B2
(45) Date of Patent: Aug. 12, 2025

(54) NODE EQUIPMENT, WAVELENGTH MONITOR, AND WAVELENGTH MONITORING METHOD

(71) Applicant: NEC Corporation, Tokyo (JP)

(72) Inventor: Morihiko Ota, Tokyo (JP)

(73) Assignee: NEC CORPORATION, Tokyo (JP)

( * ) Notice: Subject to any disclaimer, the term of this patent is extended or adjusted under 35 U.S.C. 154(b) by 139 days.

(21) Appl. No.: 18/119,200

(22) Filed: Mar. 8, 2023

(65) Prior Publication Data

US 2023/0308204 A1  Sep. 28, 2023

(30) Foreign Application Priority Data

Mar. 25, 2022 (JP) ................. 2022-050536

(51) Int. Cl.
*H04J 14/02* (2006.01)
*H04Q 11/00* (2006.01)

(52) U.S. Cl.
CPC ...... *H04J 14/0212* (2013.01); *H04Q 11/0005* (2013.01)

(58) Field of Classification Search
CPC ............ H04J 14/0212; H04Q 11/005
USPC ............................................. 398/48
See application file for complete search history.

(56) References Cited

U.S. PATENT DOCUMENTS

| | | | |
|---|---|---|---|
| 9,923,632 B2 * | 3/2018 | Yamauchi | H04J 14/0257 |
| 2008/0267631 A1 * | 10/2008 | Collings | H04J 14/0206 |
| | | | 398/97 |
| 2016/0241936 A1 * | 8/2016 | Nagamine | H04J 14/0258 |
| 2016/0308608 A1 * | 10/2016 | Ejima | H04J 14/0283 |
| 2019/0312641 A1 * | 10/2019 | Ishii | H04B 10/07957 |
| 2020/0412476 A1 * | 12/2020 | Aida | H04B 10/0777 |
| 2022/0182169 A1 * | 6/2022 | Nakagawa | H04J 14/02126 |
| 2023/0076588 A1 * | 3/2023 | Kawai | H04B 10/07 |
| 2023/0145196 A1 * | 5/2023 | Ota | H04J 14/02 |
| | | | 398/79 |

FOREIGN PATENT DOCUMENTS

| | | | | |
|---|---|---|---|---|
| EP | 3661083 A1 * | 6/2020 | | H04J 14/0208 |
| JP | 2009-229784 A | 10/2009 | | |
| JP | 2011-254309 A | 12/2011 | | |
| JP | 2014-143614 A | 8/2014 | | |
| WO | 2017/163993 A1 | 9/2017 | | |
| WO | WO-2018051935 A1 * | 3/2018 | | H04B 10/079 |

* cited by examiner

*Primary Examiner* — Amritbir K Sandhu

(57) ABSTRACT

A first WSS performs demultiplexes a first wavelength-multiplexed optical signal, outputs part of the wavelengths to a first path, and outputs a remaining wavelength to a second path. A first spectrum analyzer observes a spectrum of a first optical signal included in the first wavelength-multiplexed optical signal and a spectrum of a second optical signal output from the first WSS and outputs a first observational result. A second WSS outputs a second wavelength-multiplexed optical signal obtained by multiplexing an optical signal input from a third path to an optical signal of the remaining wavelength input from the second path. A second spectrum analyzer observes a spectrum of a third optical signal included in the optical signal input to the second WSS from the second path and a spectrum of a fourth optical signal output from the second WSS, and outputs a second observational result.

5 Claims, 13 Drawing Sheets

NODE EQUIPMENT, WAVELENGTH MONITOR, AND WAVELENGTH MONITORING METHOD

INCORPORATION BY REFERENCE

This application is based upon and claims the benefit of priority from Japanese patent application No. 2022-50536, filed on Mar. 25, 2022, the disclosure of which is incorporated herein in its entirety by reference.

TECHNICAL FIELD

The present disclosure relates to node equipment, a wavelength monitor, and a wavelength monitoring method.

BACKGROUND ART

In optical communication systems, a wavelength division multiplexing (WDM) transmission method which multiplexes and transmits optical signals with different wavelengths is adopted in order to increase transmission capacity. In the WDM transmission method, in order to transmit an optical signal with a desired wavelength to a destination, transmission control in wavelength units is performed such as multiplexing (ADD) an optical signal with a desired wavelength to a wavelength-multiplexed optical signal or demultiplexing (DROP) an optical signal with a desired wavelength from a wavelength-multiplexed optical signal.

Node equipment incorporated in an optical communication system may have a function for performing ADD/DROP of an optical signal by subjecting an input wavelength-multiplexed optical signal to wavelength filtering. Accordingly, a spectrum of the optical signal is affected by pass characteristics of the filter (International Patent Publication No. WO 2017/163993, Japanese Unexamined Patent Application Publications No. 2014-143614, 2011-254309, and 2009-229784).

SUMMARY

With WDM systems, there is a problem in that the presence of two wavelength band constriction factors including a demand for constricting used wavelength bands in order to increase channel accommodation efficiency and a deterioration in passband characteristics due to downsizing of a wavelength selective switch (WSS) causes transmission characteristics to deteriorate.

Therefore, in WDM systems, there is a demand for establishing a method of monitoring pass characteristics of a wavelength selective switch through which an optical signal passes in a transmission process.

The present disclosure has been made in consideration of the circumstances described above and an example object thereof is to monitor pass characteristics of a wavelength selective switch through which an optical signal passes in transmission of the optical signal in an optical communication system.

In a first example aspect of the present disclosure, node equipment includes: a first wavelength selective switch configured to perform wavelength demultiplexing of an input first wavelength-multiplexed optical signal, to output an optical signal of part of the wavelengths to a first path, and to output an optical signal of a remaining wavelength to a second path; a first spectrum analyzer configured to observe a spectrum of a first optical signal with a first wavelength included in the first wavelength-multiplexed optical signal and a spectrum of a second optical signal with the first wavelength output from the first wavelength selective switch, and to output a first observational result; a second wavelength selective switch configured to output a second wavelength-multiplexed optical signal obtained by performing wavelength multiplexing of an optical signal input from a third path to an optical signal of the remaining wavelength input from the second path; and a second spectrum analyzer configured to observe a spectrum of a third optical signal with a second wavelength included in the second wavelength-multiplexed optical signal input to the second wavelength selective switch from the second path and a spectrum of a fourth optical signal with the second wavelength output from the second wavelength selective switch, and to output a second observational result.

In a second example aspect of the present disclosure, a wavelength monitor includes: a wavelength selective switch configured to perform wavelength demultiplexing of an input wavelength-multiplexed optical signal, to output an optical signal of part of the wavelengths to a first path, and to output an optical signal of a remaining wavelength to a second path; and a spectrum analyzer configured to observe a spectrum of a first optical signal with a first wavelength included in the wavelength-multiplexed optical signal and a spectrum of a second optical signal with the first wavelength output from the wavelength selective switch, and to output an observational result.

In a third example aspect of the present disclosure, a wavelength monitor includes: a wavelength selective switch configured to output a wavelength-multiplexed optical signal obtained by performing wavelength multiplexing of an optical signal input from a third path to an optical signal input from a second path; and a spectrum analyzer configured to observe a spectrum of a third optical signal with a second wavelength included in the optical signal input to the wavelength selective switch from the second path and a spectrum of a fourth optical signal with the second wavelength output from the wavelength selective switch, and to output an observational result.

In a fourth example aspect of the present disclosure, a wavelength monitoring method includes: by a first wavelength selective switch, performing wavelength demultiplexing of an input first wavelength-multiplexed optical signal, outputting an optical signal of part of the wavelengths to a first path, and outputting an optical signal of a remaining wavelength to a second path; observing a spectrum of a first optical signal with a first wavelength included in the first wavelength-multiplexed optical signal and a spectrum of a second optical signal with the first wavelength output from the first wavelength selective switch and outputting a first observational result; by a second wavelength selective switch, outputting a second wavelength-multiplexed optical signal obtained by performing wavelength multiplexing of an optical signal input from a third path to an optical signal with the remaining wavelength input from the second path; and observing a spectrum of a third optical signal with a second wavelength included in the second wavelength-multiplexed optical signal input to the second wavelength selective switch from the second path and a spectrum of a fourth optical signal with the second wavelength output from the second wavelength selective switch, and outputting a second observational result.

According to the present disclosure, pass characteristics of a wavelength selective switch through which an optical signal passes can be monitored in transmission of the optical signal in an optical communication system.

BRIEF DESCRIPTION OF DRAWINGS

The above and other aspects, features and advantages of the present disclosure will become more apparent from the following description of certain exemplary embodiments when taken in conjunction with the accompanying drawings, in which.

EXAMPLE EMBODIMENT

Figure 1:
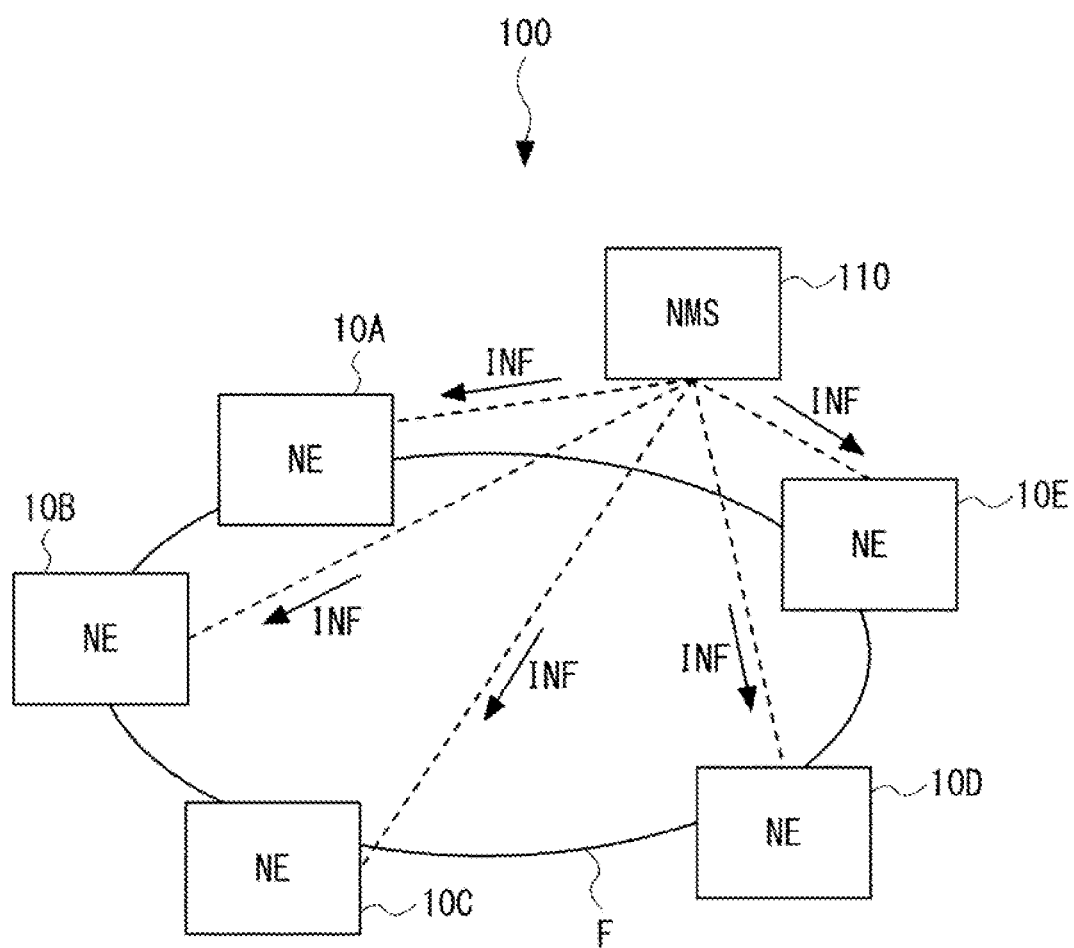
FIG. 1 is a diagram showing a network configuration example of a WDM transmission system according to a first example embodiment.

Hereinafter, example embodiments of the present disclosure will be described with reference to the drawings. In the drawings, same elements are denoted by same reference signs and repetitive descriptions will be omitted when appropriate.

First Example Embodiment

A network configuration example of a WDM (Wavelength Division Multiplexing) transmission system according to a first example embodiment will be described. FIG. 1 shows a network configuration example of a WDM transmission system 100 according to the first example embodiment. The WDM transmission system 100 is configured as an optical communication system which performs WDM transmission. The WDM transmission system 100 has five pieces of node equipment (hereinafter, NE) 10A to 10E and a network management system (hereinafter, NMS) 110. Hereinafter, when not specifying each piece of the NE 10A to 10E, a simple description of NE 10 will be used. The NE 10A to the NE 10E are connected to form a ring topology by an optical fiber F. While FIG. 1 shows five pieces of the NE 10A to 10E, the number of pieces of the NE 10 is not limited to five and may be any number. In addition, while FIG. 1 shows an example in which the number of routes of the NE 10 is two, the number of routes of the NE 10 is not limited to two.

Figure 2:
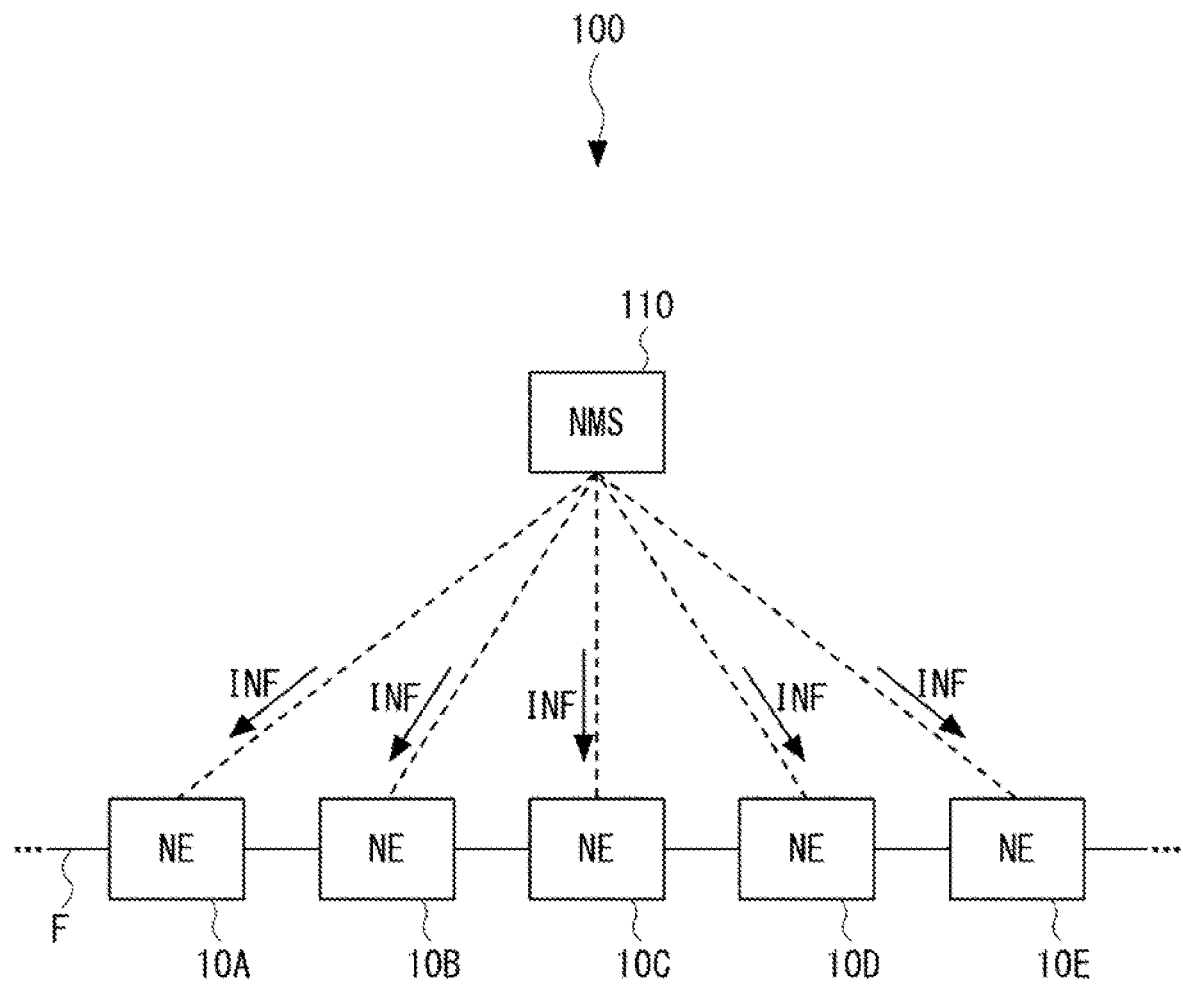
FIG. 2 is a diagram showing a configuration example of a WDM transmission system having a different network topology.

While a ring network is shown as the WDM transmission system in FIG. 1, the network topology is not limited to a ring topology. FIG. 2 shows a configuration example of the WDM transmission system 100 having a different network topology. As shown in FIG. 2, the NE 10A to the NE 10E may be connected to form a line topology by the optical fiber F.

Figure 3:
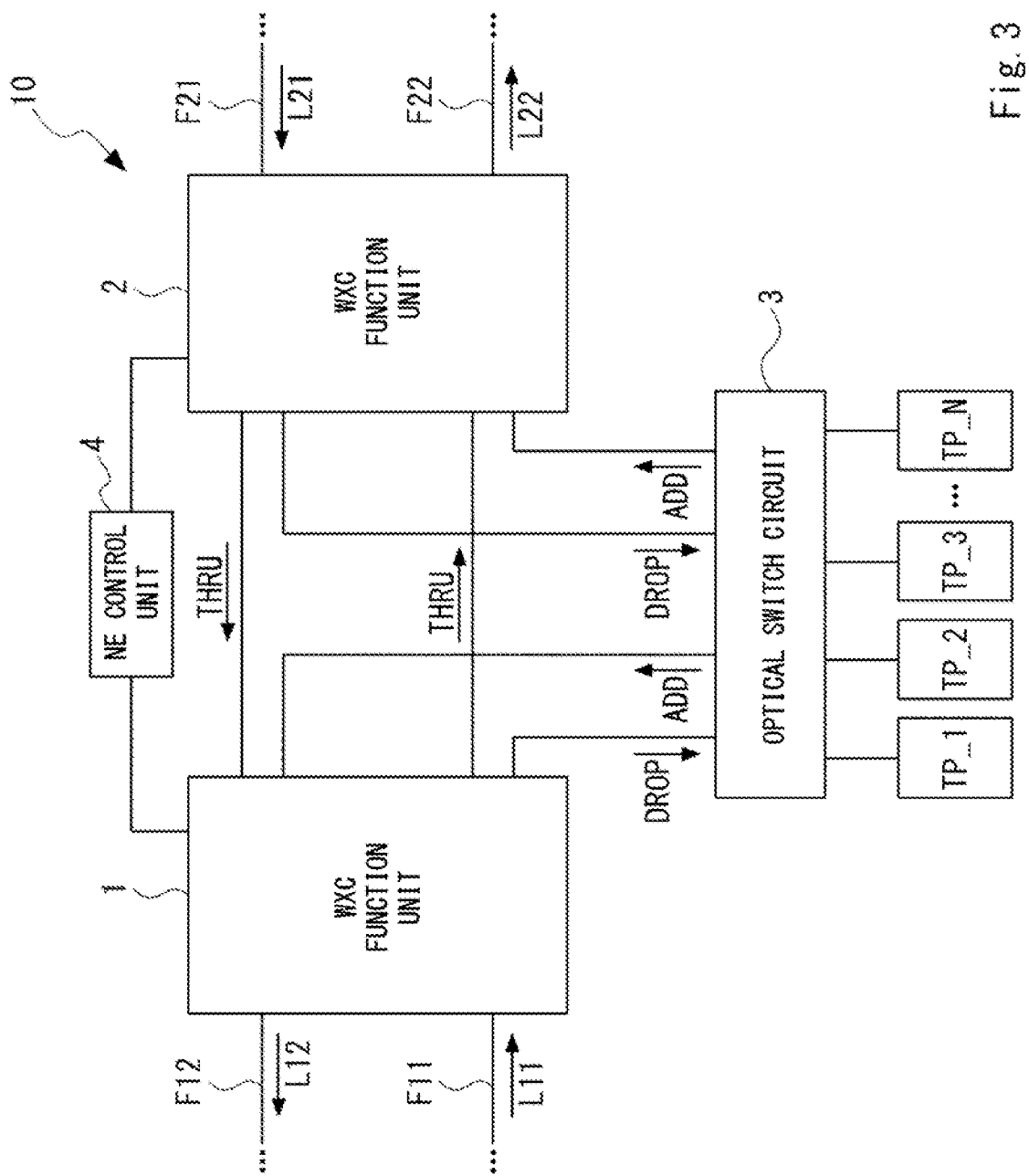
FIG. 3 is a diagram schematically showing a configuration of node equipment according to the first example embodiment.

Next, the NE 10 according to the present example embodiment will be described. FIG. 3 schematically shows a configuration of the NE 10 according to the first example embodiment. Note that FIG. 3 shows a configuration example of a case where the number of routes of the NE 10 is two in a similar manner to FIGS. 1 and 2. The NE 10 has at least an add/drop function of a transmitted optical signal and is configured as, for example, an optical add-drop multiplexer (OADM) apparatus or wavelength cross-connect node equipment.

The NE 10 has wavelength cross-connect (WXC) function units 1 and 2, an optical switch circuit 3, an NE control unit 4, and transponder function units TP_1 to TP_N, where N is an integer of 2 or more. When not specifying each of the transponder function units TP_1 to TP_N, a simple description of the transponder function unit TP will be used.

The WXC function unit 1 performs wavelength demultiplexing of an optical signal L11 (also referred to as a first wavelength-multiplexed signal) which is a wavelength-multiplexed signal input from an optical fiber F11, outputs (DROP) an optical signal with a selectively separated wavelength to the optical switch circuit 3, and allows an optical signal of a remaining wavelength to pass through (THRU) to the WXC function unit 2. In addition, the WXC function unit 1 performs wavelength multiplexing (ADD) of an optical signal input from the optical switch circuit 3 to an optical signal input from the WXC function unit 2 and outputs a multiplexed optical signal L12 to an optical fiber F12.

The WXC function unit 2 performs wavelength demultiplexing of an optical signal L21 (also referred to as a second wavelength-multiplexed signal) which is a wavelength-multiplexed signal input from an optical fiber F21, outputs (DROP) an optical signal with a selectively separated wavelength to the optical switch circuit 3, and allows an optical signal of a remaining wavelength to pass through (THRU) to the WXC function unit 1. In addition, the WXC function unit 2 performs wavelength multiplexing (ADD) of an optical signal input from the optical switch circuit 3 to an optical signal input from the WXC function unit 1 and outputs a multiplexed optical signal L22 to an optical fiber F22.

The optical switch circuit 3 multiplexes optical signals input from the transponder function units TP_1 to TP_N as necessary and outputs the optical signals to one of or both of the WXC function units 1 and 2. Accordingly, the optical signals output from the optical switch circuit 3 are added by the WXC function units 1 and 2. In addition, the optical switch circuit 3 outputs signals dropped by the WXC function unit 1 and the WXC function unit 2 to the transponder function units TP_1 to TP_N as necessary.

The NE control unit 4 is configured to be capable of controlling operations of the WXC function units 1 and 2 according to a command from the NMS 110. The NE control unit 4 is also referred to as a node equipment controller. For example, when the NE control unit 4 designates an optical path (a route of an optical signal), cross-connect route designation information for designating a route of an optical signal is transmitted from the NMS 110 to each piece of the NE 10A to 10E. In each piece of the NE 10A to 10E, the NE control unit 4 receives the route designation information INF from the NMS 110 and delivers the received route designation information INF to the WXC function units 1 and 2.

Figure 4:
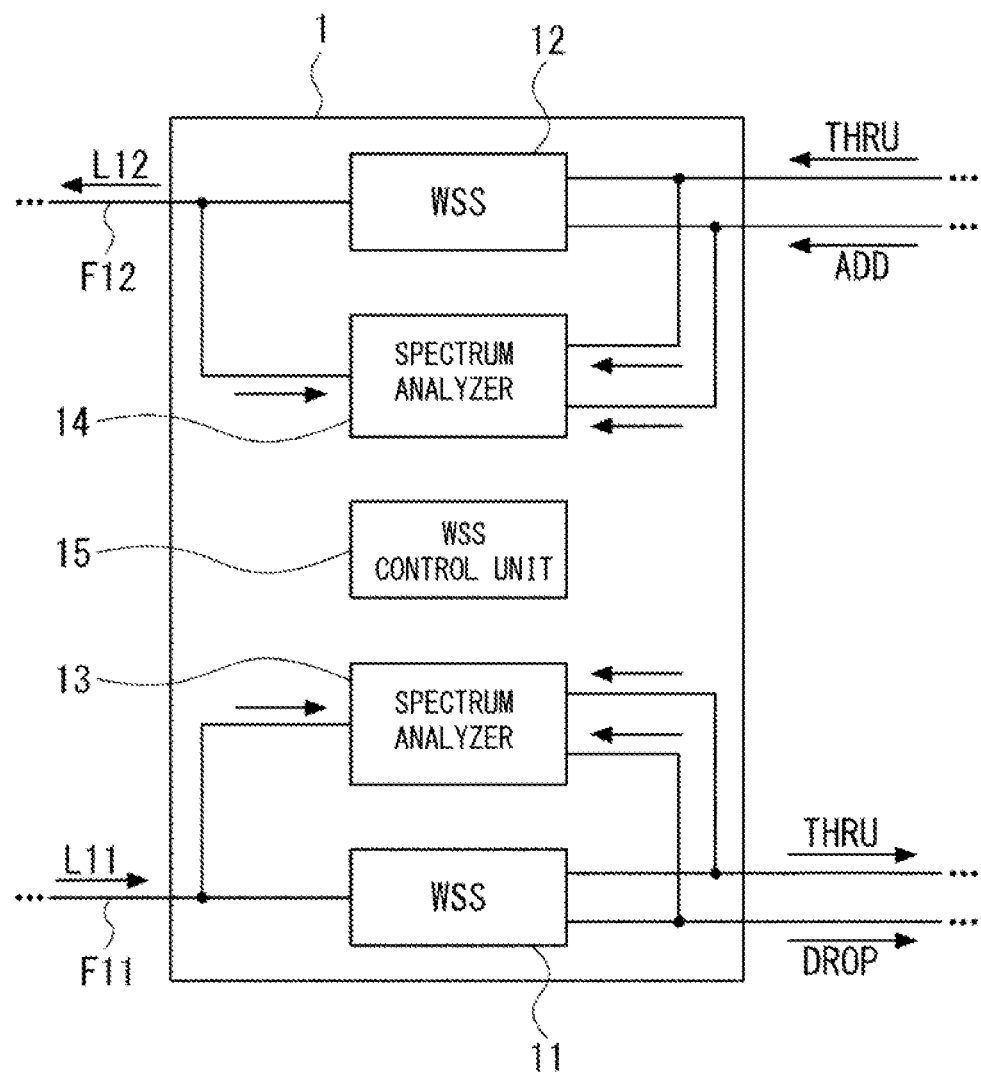
FIG. 4 is a diagram schematically showing a configuration of a wavelength cross-connect (WXC) function unit according to the first example embodiment.

Next, the WXC function unit 1 will be described. FIG. 4 schematically shows a configuration of the WXC function unit 1 according to the first example embodiment. The WXC function unit 1 has wavelength selective switches (hereinafter, WSSs) 11 and 12, spectrum analyzers 13 and 14, and a WSS control unit 15.

Figure 5:
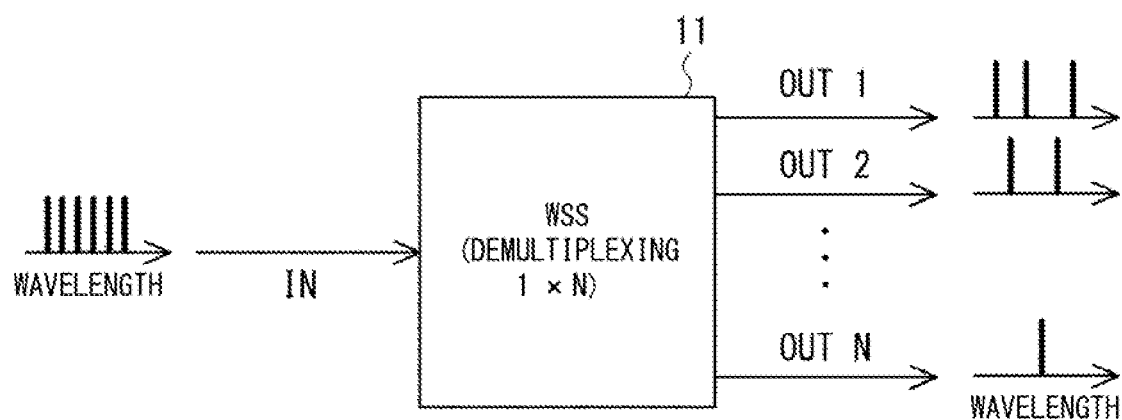
FIG. 5 is a diagram showing an example of a wavelength demultiplexing function of a wavelength selective switch (WSS) according to the first example embodiment.
Figure 6:
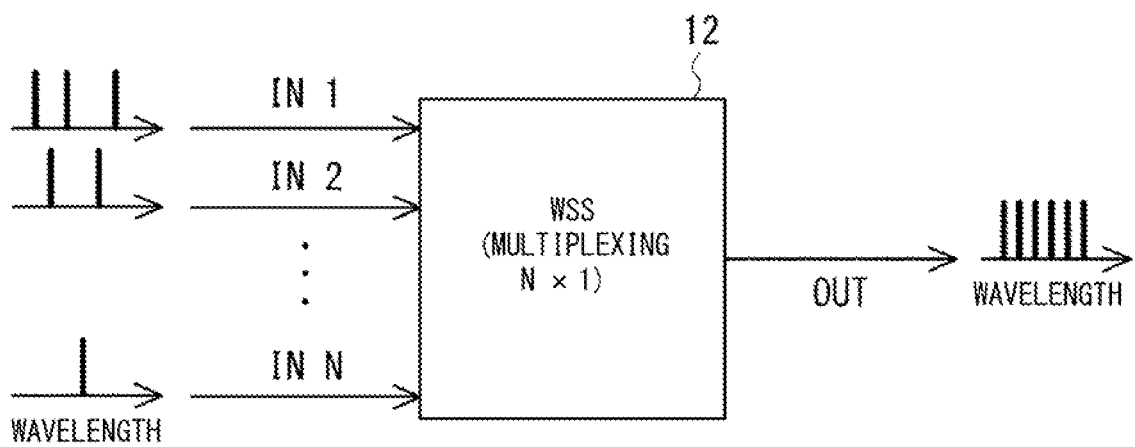
FIG. 6 is a diagram showing an example of a wavelength multiplexing function of the WSS according to the first example embodiment.

Hereinafter, a configuration of the WSSs 11 and 12 will be described. FIG. 5 shows an example of a wavelength demultiplexing function of the WSS 11 according to the first example embodiment. As shown in FIG. 5, the WSS 11 (also referred to as a first wavelength selective switch) has a function of performing wavelength demultiplexing of a wavelength-multiplexed optical signal IN which passes through the WSS 11 to optical signals OUT 1 to OUT N with respective wavelengths. FIG. 6 shows an example of a wavelength multiplexing function of the WSS 12 according to the first example embodiment. As shown in FIG. 6, the WSS 12 has a function of performing wavelength multiplexing of optical signals IN 1 to IN N with respective wavelengths which pass through the WSS 12 and outputting a wavelength-multiplexed optical signal OUT.

The spectrum analyzer 13 (also referred to as a first spectrum analyzer) is configured as a spectrum analyzer which compares a spectrum of an optical signal input to the WSS 11 with a spectrum of an optical signal output from the WSS 11 with each other to analyze the spectra. Specifically, the spectrum analyzer 13 compares a spectrum of the optical signal L11 input from the optical fiber F11 with spectra of an optical signal (THRU path) output to the WXC function unit 2 and an optical signal (DROP path) output to the optical switch circuit 3 with each other to analyze the spectra.

The spectrum analyzer 14 (also referred to as a second spectrum analyzer) is configured as a spectrum analyzer which compares a spectrum of an optical signal input to the WSS 12 with a spectrum of an optical signal output from the WSS 12 with each other to analyze the spectra. The spectrum analyzer 14 compares spectra of an optical signal (THRU path) input from the WXC function unit 2 and an optical signal (ADD path) input from the optical switch circuit 3 with a spectrum of the optical signal L12 output to the optical fiber F12 with each other to analyze the spectra.

The WSS control unit 15 (also referred to as a first wavelength selective switch control unit or a first wavelength selective switch controller) controls operations of the WSSs 11 and 12 according to a command from the NE control unit 4. For example, the WSS control unit 15 can establish a desired route of an optical signal by appropriately switching between a wavelength of an optical signal dropped by the WSS 11 and a wavelength of an optical signal added by the WSS 12 based on route designation information INF received from the NE control unit 4.

Figure 7:
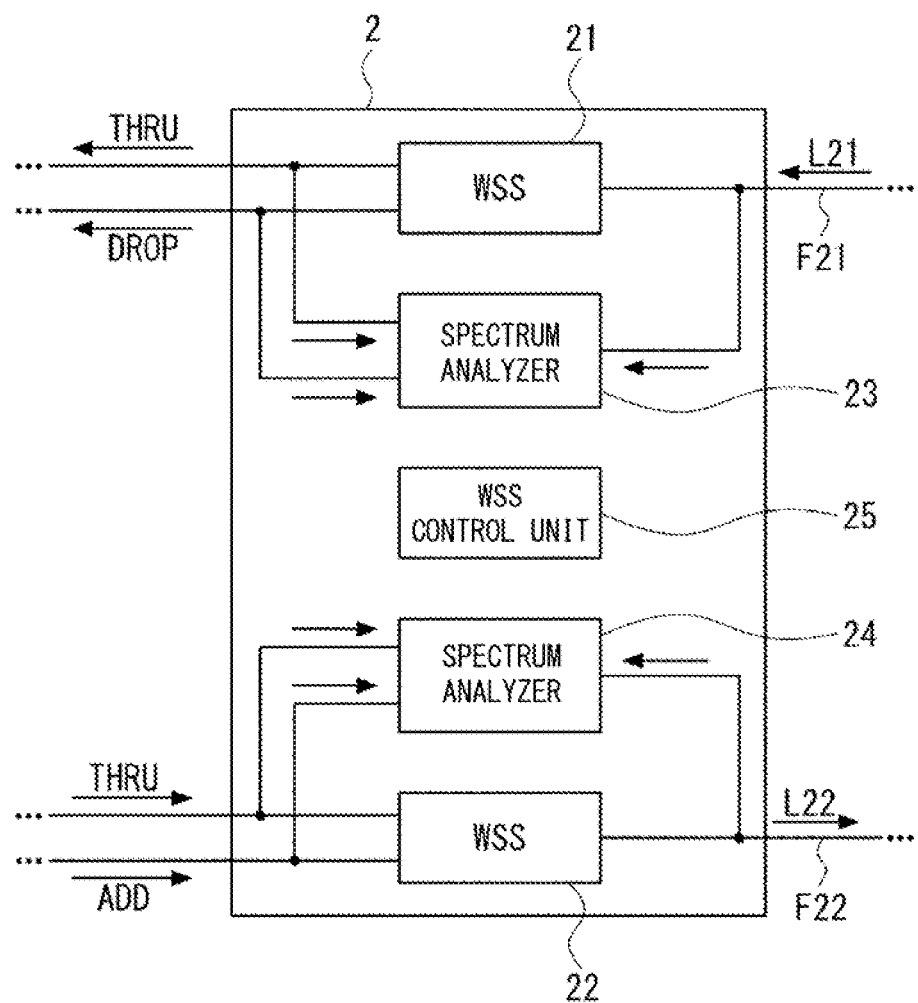
FIG. 7 is a diagram schematically showing a configuration of the WXC function unit according to the first example embodiment.

Next, the WXC function unit 2 will be described. FIG. 7 schematically shows a configuration of the WXC function unit 2 according to the first example embodiment. As shown in FIG. 7, the WXC function unit 2 has WSSs 21 and 22, spectrum analyzers 23 and 24, and a WSS control unit 25 (also referred to as a second wavelength selective switch control unit or a second wavelength selective switch controller). In the present example embodiment, the WXC function unit 2 has a similar configuration and similar functions to the WXC function unit 1. Therefore, the WSSs 21 and 22, the spectrum analyzers 23 and 24, and the WSS control unit 25 of the WXC function unit 2 respectively correspond to the WSSs 11 and 12, the spectrum analyzers 13 and 14, and the WSS control unit 15. In addition, the WSS 21 receives input of the optical signal L21 from the optical fiber F21 and the WSS 22 outputs the optical signal L22 from the optical fiber F22. Other repetitive descriptions will be omitted for the sake of brevity.

Transmission paths of optical signals in the NE 10 will be described on the premise of the configurations of the WXC function units 1 and 2 described above. While the number of routes in the NE 10 is two as described above, these routes represent two implementations of an add/drop function of a single route in which two WSSs are serially arranged and which has an add function of an optical signal from a single path and a drop function of an optical signal to a single path. Therefore, a basic add/drop mechanism of a single route and a wavelength monitoring mechanism including the add/drop mechanism will now be described. Note that an add/drop mechanism is also referred to as an add/drop apparatus or an add/drop multiplexer and a wavelength monitoring mechanism is also referred to as a wavelength monitor.

Figure 8:
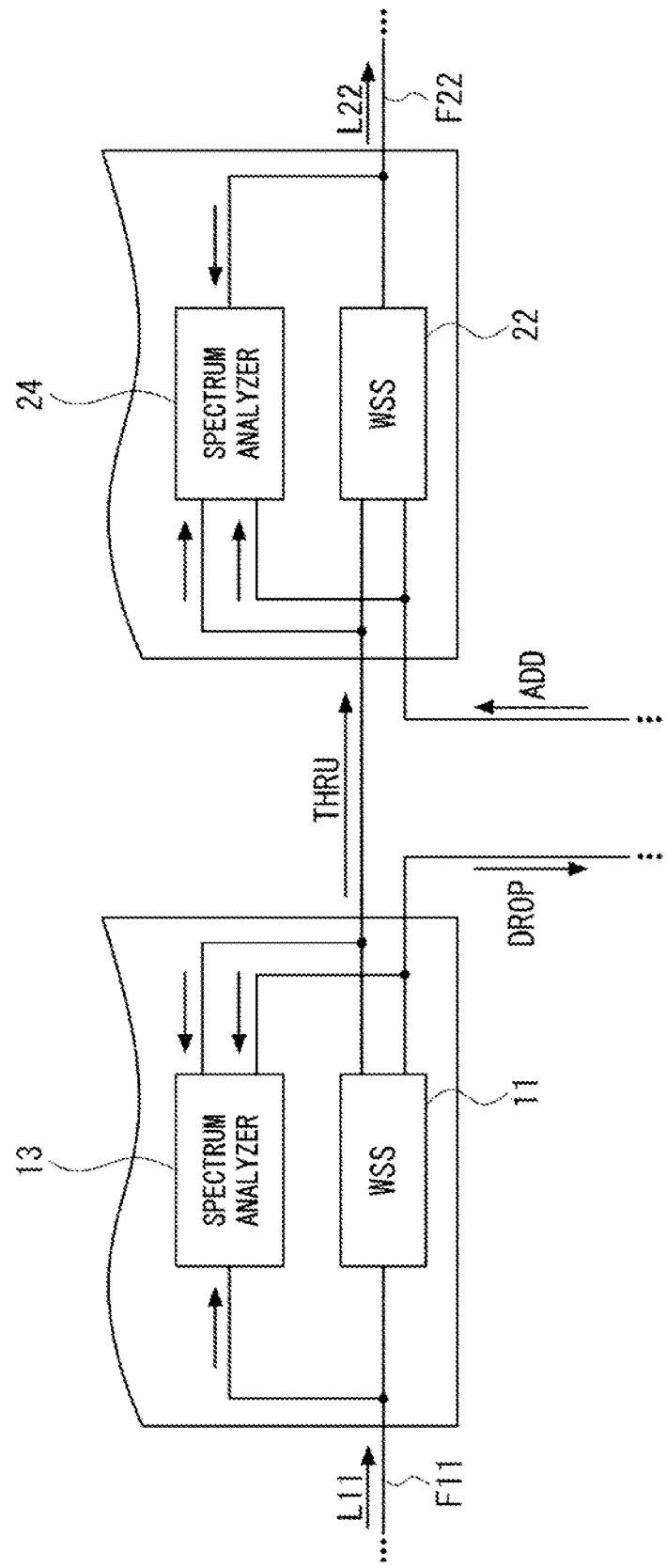
FIG. 8 is a diagram schematically showing an add/drop mechanism consisting of two WSSs and a wavelength monitoring mechanism including the add/drop mechanism.

FIG. 8 schematically shows an add/drop mechanism consisting of the WSSs 11 and 22 and a wavelength monitoring mechanism including the add/drop mechanism. The WSS 11 of the WXC function unit 1 performs wavelength demultiplexing of an optical signal input from the optical fiber F11 and outputs (drops) an optical signal with a wavelength selected by the wavelength demultiplexing to the optical switch circuit 3 (a drop path is also referred to as a first path). In addition, the WSS 11 outputs (thru) an optical signal with a wavelength other than the selected wavelength to the WSS 22 of the WXC function unit 2 as it is (a thru path is also referred to as a second path).

The WSS 22 of the WXC function unit 2 performs wavelength multiplexing (add) of an optical signal input from the optical switch circuit 3 (an input path is also referred to as a fourth path) to an optical signal output from the WSS 11 of the WXC function unit 1 or, in other words, an optical signal passed through the WSS 11 (an input path is also referred to as a third path) and outputs the wavelength-multiplexed optical signal to the optical fiber F22.

Figure 9:
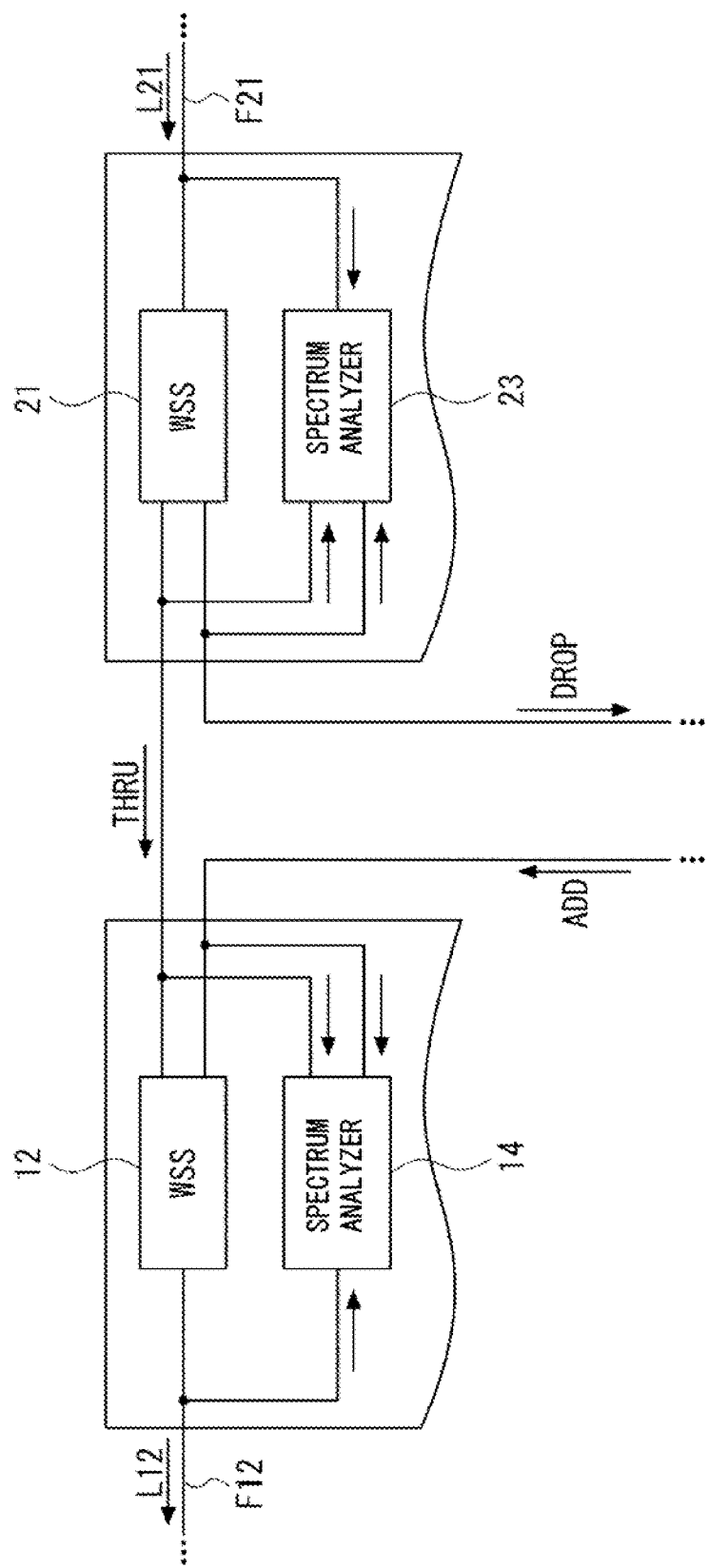
FIG. 9 is a diagram schematically showing an add/drop mechanism consisting of two WSSs and a wavelength monitoring mechanism including the add/drop mechanism.

FIG. 9 schematically shows an add/drop mechanism consisting of the WSSs 21 and 12 and a wavelength monitoring mechanism including the add/drop mechanism. The WSS 21 of the WXC function unit 2 performs wavelength demultiplexing of an optical signal input from the optical fiber F21 and outputs (drops) an optical signal with a wavelength selected by the wavelength demultiplexing to the optical switch circuit 3 (a drop path is also referred to as a first path). In addition, the WSS 21 outputs (thru) an optical signal with a wavelength other than the selected wavelength to the WSS 12 of the WXC function unit 1 as it is (a thru path is also referred to as a second path).

The WSS 12 of the WXC function unit 1 performs wavelength multiplexing (add) of an optical signal input from the optical switch circuit 3 (an input path is also referred to as a fourth path) to an optical signal output from the WSS 21 of the WXC function unit 2 or, in other words, an optical signal passed through the WSS 21 (an input path is also referred to as a third path) and outputs the wavelength-multiplexed optical signal to the optical fiber F12.

Figure 10:
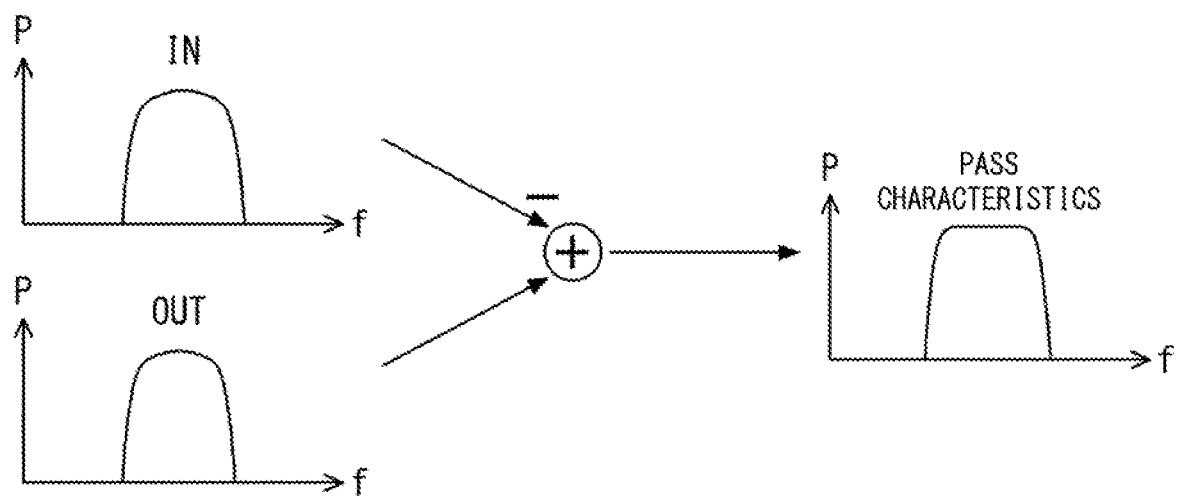
FIG. 10 is a diagram showing an outline of a spectral analysis in a spectrum analyzer according to the first example embodiment.

Next, a comparison and an analysis of spectra by each spectrum analyzer will be described. Each spectrum analyzer compares a spectrum of an input optical signal with each wavelength with a spectrum of a same wavelength (a first wavelength and a second wavelength). FIG. 10 shows an outline of a spectral analysis in the spectrum analyzer according to the first example embodiment. When a spectrum is shown in the diagram, an axis of abscissa represents a frequency f and an axis of ordinate represents power P. The spectrum analyzer can monitor pass characteristics of a corresponding WSS by acquiring a difference between an input optical signal IN of each wavelength and an optical signal OUT of the same wavelength.

In other words, the spectrum analyzer 13 compares a spectrum of an optical signal (a first optical signal) with a specific wavelength (a first wavelength) among optical signals input to the WSS 11 and a spectrum of an optical signal (a second optical signal) with a specific wavelength (the first wavelength) among optical signals output from the WSS 11 with each other to analyze the spectra. The spectrum analyzer 23 compares a spectrum of an optical signal (a first optical signal) with a specific wavelength (a first wavelength) among optical signals input to the WSS 21 and a spectrum of an optical signal (a second optical signal) with a specific wavelength (the first wavelength) among optical signals output from the WSS 21 with each other to analyze the spectra.

The spectrum analyzer 14 compares a spectrum of an optical signal (a third optical signal) with a specific wavelength (a second wavelength) among optical signals input to the WSS 12 and a spectrum of an optical signal (a fourth optical signal) with a specific wavelength (the second wavelength) among optical signals output from the WSS 12 with each other to analyze the spectra. The spectrum analyzer 24 compares a spectrum of an optical signal (a third optical signal) with a specific wavelength (a second wavelength) among optical signals input to the WSS 22 and a spectrum of an optical signal (a fourth optical signal) with a specific wavelength (the second wavelength) among optical signals output from the WSS 22 with each other to analyze the spectra.

Accordingly, due to the present configuration, based on a monitoring result of pass characteristics of each WSS, the pass characteristics of each WSS can be adjusted so as to assume a desired state.

The spectrum analyzer may output the monitoring result of pass characteristics of each WSS to the NMS 110. In this case, in consideration of a function of making a request to the NE 10 being an output source of the monitoring result in the WDM transmission system 100, for example, a target value of the pass characteristics of each WSS may be determined and issued as a command to the NE 10 being an object. In this case, the NE control unit 4 of the NE 10 issues a command for performing control necessary for the WSS with respect to the NE control unit 4 of the WXC function unit to be an object of control. Based on the command, the WSS control units 15 and 25 can adjust pass characteristics (filter characteristics) of the object WSS according to the command.

Figure 11:
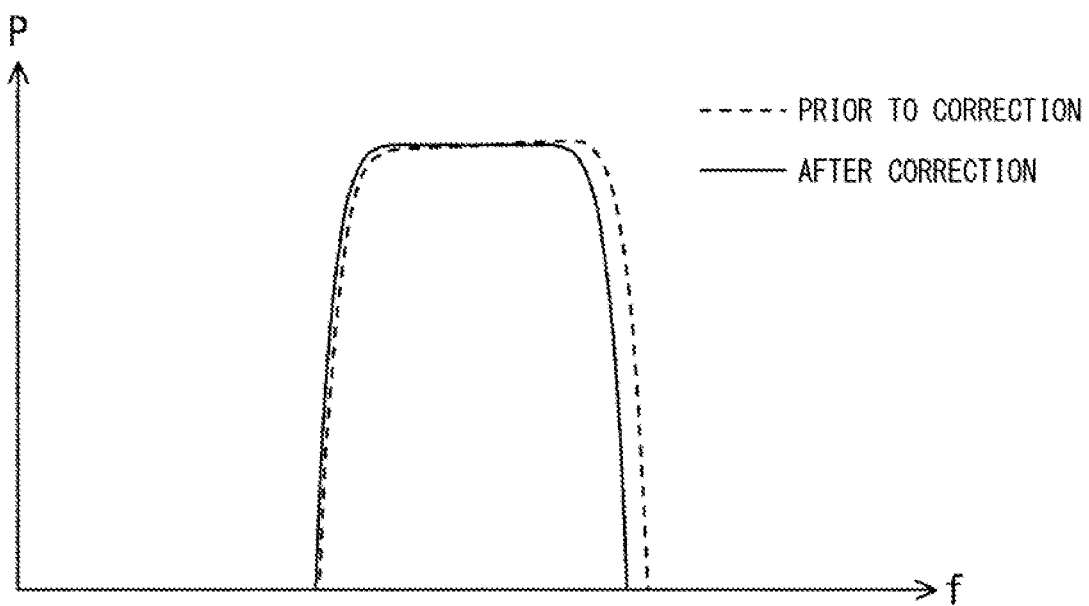
FIG. 11 is a diagram showing an outline of an adjustment of pass characteristics of a WSS.

FIG. 11 shows an outline of an adjustment of the pass characteristics of a WSS. A case where the pass characteristics (a dashed line in FIG. 11) of the WSS 11 acquired by observation have shifted to a high-frequency side with respect to a target (a solid line in FIG. 11) of the pass characteristics of the WSS 11 will be assumed as an example. In this case, the WSS control unit 15 may control the WSS 11 so that the pass characteristics (dashed line) of the WSS 11 match the target (solid line). At this point, the WSS control unit 15 can appropriately adjust a center frequency and a width of the pass characteristics of the WSS 11.

The target value of the pass characteristics (filter characteristics) of each WSS may be determined in advance and stored in the WSS control units 15 and 25. In this case, the WSS control units 15 and 25 may adjust the pass characteristics (filter characteristics) of the WSS so as to match a target value as appropriate based on a monitoring result of controllable pass characteristics (filter characteristics) of the WSS.

Second Example Embodiment

In a second example embodiment, an example in which a spectrum analyzer performs a spectral analysis after correcting a spectrum will be described. In the present second example embodiment, while operations in a WDM transmission system differ, since configurations of the WDM transmission system, WXC function units, and the like are similar to those in the first example embodiment, repetitive descriptions will be omitted.

Figure 12:
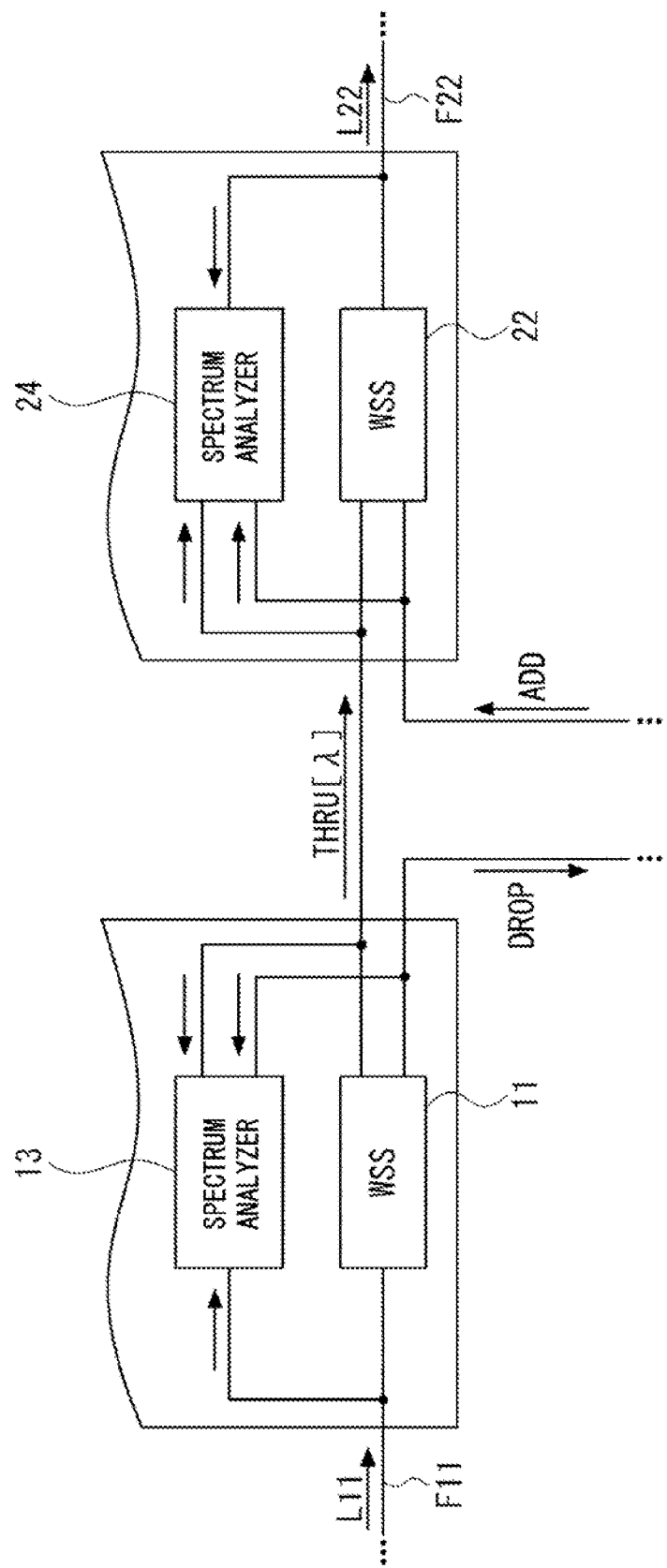
FIG. 12 is a diagram schematically showing a substantial part of a WDM transmission system according to a second example embodiment.

FIG. 12 schematically shows a substantial part of a WDM transmission system according to the second example embodiment. In the present example, when focusing on a specific wavelength (channel) 2 of a transmitted optical signal, a spectrum observed by a spectrum analyzer attached to a former-stage WSS and a spectrum observed by a spectrum analyzer attached to a latter-stage WSS are compared with each other. In addition, by correcting an observational error of frequencies obtained from the observational results, pass characteristics of the WSSs are evaluated with precision. In this case, a description will be given on the assumption that the former-stage WSS is the WSS 11 of the WXC function unit 1 and the latter-stage WSS is the WSS 22 of the WXC function unit 2.

Figure 13:
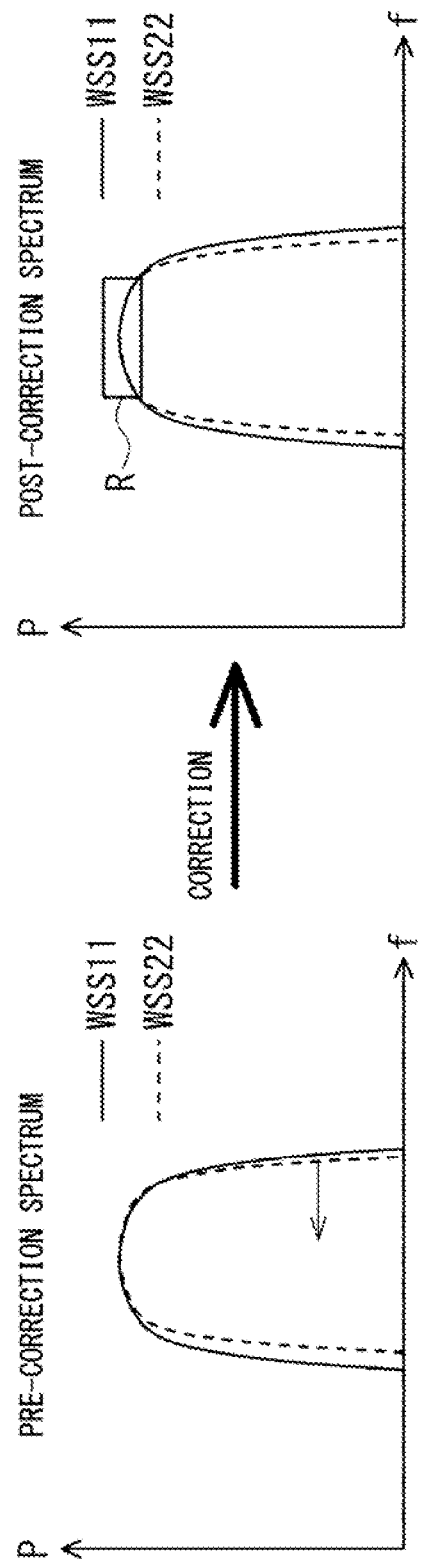
FIG. 13 is a diagram showing an output spectrum of a former-stage WSS, an output spectrum of a latter-stage WSS, and a spectrum after correction.

FIG. 13 shows an output spectrum of the former-stage WSS 11, an output spectrum of the latter-stage WSS 22, and a spectrum after correction. Generally, a miscalculation in frequency detection accuracy exists between different spectrum analyzers. For example, as shown in the spectrum prior to the correction shown in FIG. 13, a center frequency of the output spectrum of the latter-stage WSS 22 observed by the spectrum analyzer 24 is shifted to a positive side with respect to the output spectrum of the former-stage WSS 11 observed by the spectrum analyzer 13.

As shown in FIG. 13, a comparison of observational results by different spectrum analyzers can be realized by, for example, transmitting the observational result of each spectrum analyzer to the NMS 110 and having the NMS 110 compare the observational results. In addition, the NMS 110 can detect a frequency shift amount and issue a command to correct the shift amount to the spectrum analyzer 13 of the WXC function unit 1 and the spectrum analyzer 24 of the WXC function unit 2. Accordingly, the center frequencies of the spectra observed by both spectrum analyzers can be made to match each other.

As a correction method of matching the center frequency of the spectrum observed in the former stage and the center frequency of the spectrum observed in the latter stage with each other, various methods may be used. An example method thereof will now be described. For example, the spectrum of one of or both of the spectrum analyzers 13 and 24 may be corrected so as to maximize a matching portion of a spectrum of a predetermined range R centered on a peak of each spectrum. In this case, since the correction can be performed based on a spectrum near a peak which is not affected by filtering in a WSS, highly accurate correction can be realized.

Spectrum correction between spectra observed by two spectrum analyzers has been described above. However, even when WSSs are provided in multiple stages, by sequentially performing the spectrum correction between spectra observed by two spectrum analyzers, pass characteristics of an optical signal in an entire system can be monitored with high accuracy.

In addition, the two spectra to be objects of comparison are not limited to two spectrum analyzers in the same NE and may be two spectrum analyzers provided in different pieces of NE. In other words, as shown in FIGS. 1 and 2, when the WDM transmission system includes a plurality of pieces of NE, correction may be appropriately performed by comparing a spectrum by a spectrum analyzer monitoring a WSS included in one piece of NE with a spectrum by a spectrum analyzer monitoring a WSS included in another piece of NE.

According to the present configuration, as described above, the pass characteristics of a WSS can be appropriately adjusted even after start of operation of an optical communication system. Therefore, pass characteristics of a WSS to be taken into consideration during system design can be eased and system design can be carried out in a more flexible manner.

Other Example Embodiments

The present disclosure is not limited to the example embodiments described above and can be appropriately modified without deviating from the scope and spirit of the disclosure. For example, while an example in which the NMS 110 issues a correction command has been described, observational results of spectra may be consolidated to one of the WXC function unit 1 and the WXC function unit 2. In this case, the WSS control unit of the WXC function unit to which observational results have been consolidated may detect a frequency shift amount and issue a command to correct the shift amount to a spectrum analyzer.

In addition, the spectrum analyzer of the WXC function unit to which observational results have been consolidated may detect a frequency shift amount and correct the shift amount in a collective manner. When processing means other than the spectrum analyzer and the WSS control unit is provided in the WXC function unit, the processing means may detect a frequency shift amount and issue a command to correct the shift amount to the spectrum analyzer.

The first and second embodiments can be combined as desirable by one of ordinary skill in the art.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

The whole or part of the example embodiments disclosed above can be described as, but not limited to, the following supplementary notes.

Supplementary Note 1

Node equipment including: a first wavelength selective switch configured to perform wavelength demultiplexing of an input first wavelength-multiplexed optical signal, to output an optical signal of part of the wavelengths to a first path, and to output an optical signal of a remaining wavelength to a second path; a first spectrum analyzer configured to observe a spectrum of a first optical signal with a first wavelength included in the first wavelength-multiplexed optical signal and a spectrum of a second optical signal with the first wavelength output from the first wavelength selective switch, and to output a first observational result; a second wavelength selective switch configured to output a second wavelength-multiplexed optical signal obtained by performing wavelength multiplexing of an optical signal input from a third path to an optical signal of the remaining wavelength input from the second path; and a second spectrum analyzer configured to observe a spectrum of a third optical signal with a second wavelength included in the second wavelength-multiplexed optical signal input to the second wavelength selective switch from the second path and a spectrum of a fourth optical signal with the second wavelength output from the second wavelength selective switch, and to output a second observational result.

Supplementary Note 2

The node equipment according to Supplementary note 1, in which the first spectrum analyzer is configured to acquire pass characteristics of an optical signal in the first wavelength selective switch by subtracting the spectrum of the first optical signal from the spectrum of the second optical signal based on the first observational result, and the second spectrum analyzer is configured to acquire pass characteristics of an optical signal in the second wavelength selective switch by subtracting the spectrum of the third optical signal from the spectrum of the fourth optical signal based on the second observational result.

Supplementary Note 3

The node equipment according to Supplementary note 2, further including: a first wavelength selective switch control unit configured to control the first wavelength selective switch; and a second wavelength selective switch control unit configured to control the second wavelength selective switch; in which the first wavelength selective switch control unit is configured to adjust, based on the acquired pass characteristics of an optical signal in the first wavelength selective switch, pass characteristics of an optical signal of the first wavelength selective switch, and the second wavelength selective switch control unit is configured to adjust, based on the acquired pass characteristics of an optical signal in the second wavelength selective switch, pass characteristics of an optical signal of the second wavelength selective switch.

Supplementary Note 4

The node equipment according to Supplementary note 3, in which a processing apparatus is configured to acquire the first and second observational results, and the processing apparatus is configured to detect an error between a center frequency of a spectrum of the second optical signal and a center frequency of a spectrum of the fourth optical signal based on the first and second observational results.

Supplementary Note 5

The node equipment according to Supplementary note 4, in which the processing apparatus is configured to issue, based on the detected error, a command to the first and second wavelength selective switch control units so that the center frequency of the spectrum of the second optical signal and the center frequency of the spectrum of the fourth optical signal match each other, and the first and second wavelength selective switch control units are configured to respectively control the first and second wavelength selective switches according to the command so that the center frequency of the spectrum of the second optical signal and the center frequency of the spectrum of the fourth optical signal match each other.

Supplementary Note 6

The node equipment according to Supplementary note 4, in which one of or both of the first and second wavelength selective switch control units are configured to function as the processing apparatus.

Supplementary Note 7

A wavelength monitoring monitor including: a wavelength selective switch configured to perform wavelength demultiplexing of an input wavelength-multiplexed optical signal, to output an optical signal of part of the wavelengths to one path, and to output an optical signal of a remaining wavelength to another path; and a spectrum analyzer configured to observe a spectrum of a first optical signal with a first wavelength included in the wavelength-multiplexed optical signal and a spectrum of a second optical signal with the first wavelength output from the wavelength selective switch, and to output an observational result.

Supplementary Note 8

The wavelength monitoring monitor according to Supplementary note 7, in which the spectrum analyzer is configured to acquire pass characteristics of an optical signal in the wavelength selective switch by subtracting the spectrum of the first optical signal from the spectrum of the second optical signal based on the observational result.

Supplementary Note 9

A wavelength monitoring monitor including: a wavelength selective switch configured to output a wavelength-multiplexed optical signal obtained by performing, to an optical signal input from one path, wavelength multiplexing of an optical signal input from another path; and a spectrum analyzer configured to observe a spectrum of a third optical signal with a second wavelength included in the optical signal input to the wavelength selective switch and a spectrum of a fourth optical signal with the second wavelength output from the wavelength selective switch, and to output an observational result.

Supplementary Note 10

The wavelength monitoring monitor according to Supplementary note 9, in which the spectrum analyzer is configured to acquire pass characteristics of an optical signal in the wavelength selective switch by subtracting the spectrum of the third optical signal from the spectrum of the fourth optical signal based on the observational result.

Supplementary Note 11

A wavelength monitoring method including: by a first wavelength selective switch, performing wavelength demultiplexing of an input first wavelength-multiplexed optical signal, outputting an optical signal of part of the wavelengths to a first path, and outputting an optical signal of a remaining wavelength to a second path; observing a spectrum of a first optical signal with a first wavelength included in the first wavelength-multiplexed optical signal and a spectrum of a second optical signal with the first wavelength output from the first wavelength selective switch and outputting a first observational result; by a second wavelength selective switch, outputting a second wavelength-multiplexed optical signal obtained by performing wavelength multiplexing of an optical signal input from a third path to an optical signal with the remaining wavelength input from the second path; and observing a spectrum of a third optical signal with a second wavelength included in the second wavelength-multiplexed optical signal input to the second wavelength selective switch from the second path and a spectrum of a fourth optical signal with the second wavelength output from the second wavelength selective switch, and outputting a second observational result.

What is claimed is:

1. Node equipment comprising:
    a first wavelength selective switch configured to perform wavelength demultiplexing of an input first wavelength-multiplexed optical signal, to output an optical signal of part of the wavelengths to a first path, and to output an optical signal of a remaining wavelength to a second path;
    a first spectrum analyzer configured to observe a spectrum of a first optical signal with a first wavelength included in the first wavelength-multiplexed optical signal and a spectrum of a second optical signal with the first wavelength output from the first wavelength selective switch, and to output a first observational result;
    a second wavelength selective switch configured to output a second wavelength-multiplexed optical signal obtained by performing wavelength multiplexing of an optical signal input from a third path to an optical signal of the remaining wavelength input from the second path;
    a second spectrum analyzer configured to observe a spectrum of a third optical signal with a second wavelength included in the second wavelength-multiplexed optical signal input to the second wavelength selective switch from the second path and a spectrum of a fourth optical signal with the second wavelength output from the second wavelength selective switch, and to output a second observational result;
    a first wavelength selective switch controller that controls the first wavelength selective switch; and
    a second wavelength selective switch controller that controls the second wavelength selective switch, wherein
    the first spectrum analyzer acquires pass characteristics of an optical signal in the first wavelength selective switch by subtracting the spectrum of the first optical signal from the spectrum of the second optical signal based on the first observational result,
    the second spectrum analyzer acquires pass characteristics of an optical signal in the second wavelength selective switch by subtracting the spectrum of the third optical signal from the spectrum of the fourth optical signal based on the second observational result,
    the first wavelength selective switch controller adjusts, based on the acquired pass characteristics of an optical signal in the first wavelength selective switch, pass characteristics of an optical signal of the first wavelength selective switch, and the second wavelength selective switch controller adjusts, based on the acquired pass characteristics of an optical signal in the second wavelength selective switch, pass characteristics of an optical signal of the second wavelength selective switch.

2. The node equipment according to claim 1, wherein
a processor of the node equipment acquires the first and second observational results, and
the processor detects an error between a center frequency of a spectrum of the second optical signal and a center frequency of a spectrum of the fourth optical signal based on the first and second observational results.

3. The node equipment according to claim 2, wherein
the processor issues, based on the detected error, a command to the first and second wavelength selective switch controllers so that the center frequency of the spectrum of the second optical signal and the center frequency of the spectrum of the fourth optical signal match each other, and
the first and second wavelength selective switch controllers respectively control the first and second wavelength selective switches according to the command so that the center frequency of the spectrum of the second optical signal and the center frequency of the spectrum of the fourth optical signal match each other.

4. The node equipment according to claim 2, wherein one of or both of the first and second wavelength selective switch controllers function as the processor.

5. A wavelength monitoring method comprising:
by a first wavelength selective switch, performing wavelength demultiplexing of an input first wavelength-multiplexed optical signal, outputting an optical signal of part of the wavelengths to a first path, and outputting an optical signal of a remaining wavelength to a second path;
observing a spectrum of a first optical signal with a first wavelength included in the first wavelength-multiplexed optical signal and a spectrum of a second optical signal with the first wavelength output from the first wavelength selective switch and outputting a first observational result;
by a second wavelength selective switch, outputting a second wavelength-multiplexed optical signal obtained by performing wavelength multiplexing of an optical signal input from a third path to an optical signal with the remaining wavelength input from the second path;
observing a spectrum of a third optical signal with a second wavelength included in the second wavelength-multiplexed optical signal input to the second wavelength selective switch from the second path and a spectrum of a fourth optical signal with the second wavelength output from the second wavelength selective switch, and outputting a second observational result;
acquiring pass characteristics of an optical signal in the first wavelength selective switch by subtracting the spectrum of the first optical signal from the spectrum of the second optical signal based on the first observational result;
acquiring pass characteristics of an optical signal in the second wavelength selective switch by subtracting the spectrum of the third optical signal from the spectrum of the fourth optical signal based on the second observational result;
controlling the first wavelength selective switch to adjust, based on the acquired pass characteristics of an optical signal in the first wavelength selective switch, pass characteristics of an optical signal of the first wavelength selective switch; and
controlling the second wavelength selective switch to adjust, based on the acquired pass characteristics of an optical signal in the second wavelength selective switch, pass characteristics of an optical signal of the second wavelength selective switch.

* * * * *